United States Patent
Yamabe et al.

(10) Patent No.: US 11,582,984 B2
(45) Date of Patent: Feb. 21, 2023

(54) CONFECTIONERY HAVING GRAPE-LIKE MOUTHFEEL

(71) Applicant: UHA Mikakuto Co., Ltd., Yamatokooriyama (JP)

(72) Inventors: Fumitaka Yamabe, Yamatokooriyama (JP); Koichi Masumoto, Yamatokooriyama (JP); Kiyoshi Suzuki, Yamatokooriyama (JP); Yasuyuki Takishima, Yamatokooriyama (JP); Kenji Osada, Yamatokooriyama (JP); Yasumasa Yamada, Yamatokooriyama (JP)

(73) Assignee: UHA MIKAKUTO CO., LTD., Yamatokooriyama (JP)

( * ) Notice: Subject to any disclaimer, the term of this patent is extended or adjusted under 35 U.S.C. 154(b) by 124 days.

(21) Appl. No.: 16/622,844

(22) PCT Filed: Jun. 14, 2017

(86) PCT No.: PCT/JP2017/021951
§ 371 (c)(1),
(2) Date: Dec. 13, 2019

(87) PCT Pub. No.: WO2018/229894
PCT Pub. Date: Dec. 20, 2018

(65) Prior Publication Data
US 2020/0196625 A1 Jun. 25, 2020

(51) Int. Cl.
*A23G 3/36* (2006.01)

(52) U.S. Cl.
CPC ............ *A23G 3/36* (2013.01); *A23V 2002/00* (2013.01)

(58) Field of Classification Search
CPC ... A23G 3/36; A23G 3/00; A23G 3/42; A23G 3/44; A23G 3/48; A23V 2002/00
USPC .................................................. 426/660, 573
See application file for complete search history.

(56) References Cited

U.S. PATENT DOCUMENTS

| 5,328,711 A * | 7/1994 | Coleman ................... A23G 3/44 426/660 |
| 2015/0351422 A1 * | 12/2015 | Kuhn ....................... A23G 3/38 426/660 |
| 2017/0223982 A1 * | 8/2017 | Yamabe ................. A23G 3/343 |

FOREIGN PATENT DOCUMENTS

| CN | 106666035 A | | 5/2017 |
| EP | 3187053 A1 | | 7/2015 |
| JP | 60-68989 U | | 5/1985 |
| JP | H05-184282 A | | 7/1993 |
| JP | 2971036 B | | 11/1999 |
| JP | 2000-116342 A | | 4/2000 |
| JP | 3405843 B2 | | 5/2003 |
| JP | 3586686 B2 | | 11/2004 |
| JP | 2007-209283 A | | 8/2007 |
| JP | 2009213368 A | * | 9/2009 |
| JP | 2010-239924 A | | 10/2010 |
| JP | 2013-218391 A | | 10/2013 |
| JP | 2014-45713 A | | 3/2014 |
| JP | 2015-080419 A | | 4/2015 |
| JP | 2015080419 A | * | 4/2015 |
| JP | 2016-36305 A | | 3/2016 |
| JP | 5953024 B2 | | 7/2016 |
| KR | 101726435 B1 | | 4/2017 |
| WO | 2016/021717 A1 | | 2/2016 |

OTHER PUBLICATIONS

International Search Report for International Application No. PCT/JP2017/021951 dated Aug. 15, 2017 (3 sheets, 2 sheets translation, 5 sheets total).
Written Opinion of the International Searching Authority for International Application No. PCT/JP2017/021951 dated Aug. 15, 2017 (5 sheets).

* cited by examiner

*Primary Examiner* — Jyoti Chawla
(74) *Attorney, Agent, or Firm* — Kratz, Quintos & Hanson, LLP

(57) ABSTRACT

A confectionery having a grape-like mouthfeel, includes: a solidified gel composition; and a collagen casing coating the solidified gel composition, in which the solidified gel composition has a dynamic viscoelastic pattern similar to that of a flesh of a raw grape. Thus, the confectionery has a grape-like mouthfeel, i.e., a disintegration mouthfeel similar to that of a raw grape with skin. Examples of the dynamic viscoelastic pattern include a dynamic viscoelastic pattern in which a loss tangent value at an angular frequency of 63.1 rad/S decreases by 34 to 83% relative to a loss tangent value at an angular frequency of 3.98 rad/S.

11 Claims, 1 Drawing Sheet

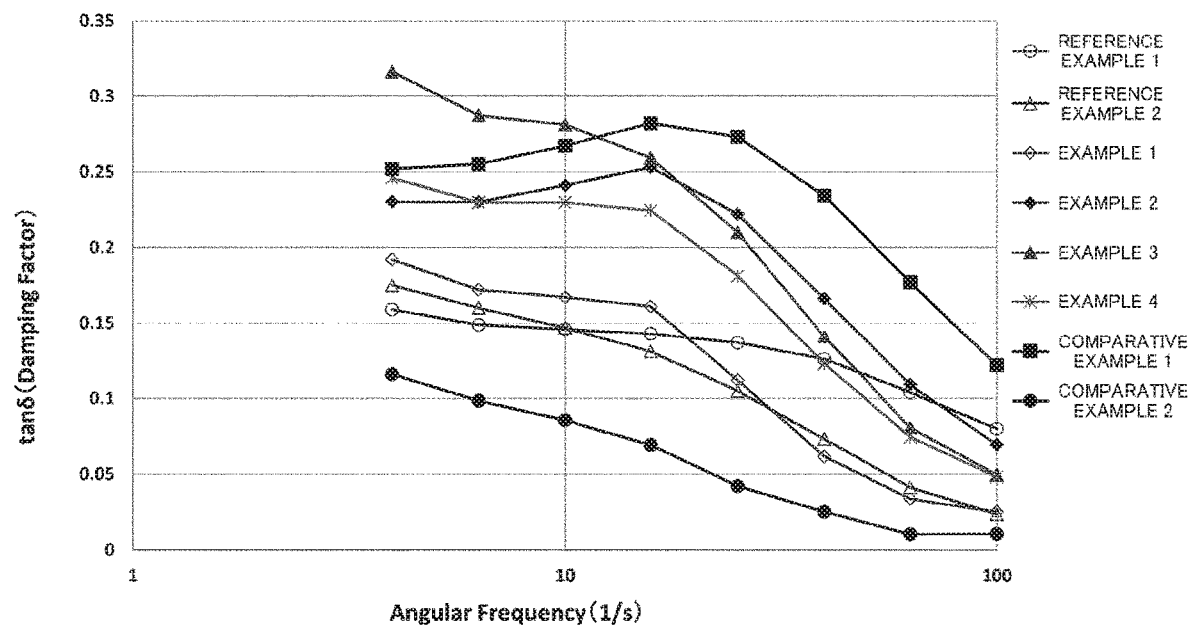

CONFECTIONERY HAVING GRAPE-LIKE MOUTHFEEL

TECHNICAL FIELD

The present invention relates to a confectionery having a grape-like mouthfeel. More specifically, the present invention relates to a confectionery having a disintegration mouthfeel similar to that of a raw grape with skin.

BACKGROUND ART

Gummy candies and jellies are popular among consumers due to the unique elasticity from gelatin or other gelling agents and ability to retain a variety of flavors. Gummy candies are generally made using gelatin or pectin, such as those represented by Pure Gummy (registered trademark and product name, manufactured by Kanro Inc.), Zerosh (registered trademark and product name, manufactured by Mikakuto Co., Ltd), and the like. These gummy candies have fruit flavors imparted by blending, for example, fruit juice and flavorings, and are said to have a fruit-like or fruit flesh-like mouthfeel. These gummy candies, however, have strong elasticity derived from gelatin and don't reproduce the fruit juice feeling of raw fruits, or a fruit-like or fruit flesh-like mouthfeel.

Some jellies contain raw fruits within the jellies. However, these jellies have problems that expiration days are limited to about 1 to 2 weeks because of the use of raw fruits, and the fruit-like mouthfeel or fruit juice feeling is easily lost due to replacement of water in the fruits with the sugar solution in the jellies. As mentioned above, fruit flavor, especially grape flavor, is popular in the field of gummy candies or jellies. Fruit flavor can be imparted to some extent by blending fruit juice or flavorings as mentioned above. However, imparting a fruit juice feeling or a fruit-like or fruit flesh-like mouthfeel is one of the big challenges in this field.

Examples of conventional confectioneries having a fruit-like or fruit flesh-like mouthfeel include: a food that has pineapple-like tissues and a mouthfeel and that is made by cooling and solidifying a gel including a gellan gum, then moderately freezing the gel while controlling the freezing direction, and then thawing (patent literature 1); a fruit flesh-like jelly that has an appearance and a mouthfeel of fibrous tissues, and is made by cooling and solidifying a gel containing a gellan gum, a tamarind seed gum, a locust bean gum, a xanthan gum, a milk serum protein, and trisodium citrate (patent literature 2); and a jelly food that is made by solidifying a jelly mixture of a water soluble polymer that gelates when reacted with metal ions, such as pectin, and a water soluble polymer containing metal ions, such as gum arabic (patent literature 3). However, the patent literatures 1 and 2 are not for a grape-like mouthfeel. The jelly food of patent literature 3 is in the form of a beverage (paragraph 0010) and does not reproduce the mouthfeel of real fruit flesh.

Meanwhile, examples of foods that use collagen casings include: a gummy candy that is made by filling collagen casings (hereinafter, also referred to as "casing") with a sol that contains, for example, a hypoallergenic gelatin containing only the gelatin derived from type II collagen, sugar, and starch syrup, and cooling and solidifying the sol (patent literature 4); and a processed meat product such as a sausage that is made by mixing a jelly containing a gelatin and a gellan gum and a meat processing material such as pork, and then filling a casing with the resulting mixture (patent literature 5). Patent literature 4 is for utilization of a specific hypoallergenic gelatin, and patent literature 5 is for improvement of the mouthfeel of processed meat products. Neither patent literature 4 nor 5 is targeted to obtain a fruit-like or fruit flesh-like mouthfeel using casings. The mouthfeels of the casing of the gummy candy and the processed meat product described in the patent literatures 4 and 5 are far from a fruit skin-like mouthfeel.

Liquid foods that include a cellulose composite containing cellulose and a hydrophilic thickening agent such as psyllium seed gum as well as fruits and/or vegetables has been proposed (patent literature 6). In patent literature 6, as an index for the suspension stability of the cellulose composite, a predetermined range is specified for the storage modulus of the cellulose composite. However, patent literature 6 aims to provide a liquid food, and therefore, does not target reproduction of a fruit-like or fruit flesh-like mouthfeel.

Patent literature 7 indicates that the typical thickness of a casing is greater than or equal to about 30 μm, and a breakage or the like is likely to occur if the thickness is less than that. Patent literature 8 describes a jelly candy that is made by filling a casing having a thickness of 5 to 100 μm, with a gel obtained by heating and dissolving a gelatin or a pectin, starch syrup, sugar, an acid, a flavoring, and a coloring in water. Patent literatures 9 and 10 each describe a gummy candy that is made by filling a casing with a gel containing greater than or equal to 20 wt. % of water and specified amounts of a saccharide, a gelling agent, a polysaccharide thickener, and the like. The gummy candies described in patent literatures 9 and 10 are commercially available under the product name "CORORO (registered trademark)" and popular among consumers for the gummy candies' fruit juice feeling, fruit-like, fruit flesh-like, and fruit skin-like mouthfeels close to the mouthfeel of a raw grape.

CITATION LIST

Patent Literature

[PTL 1] Japanese Patent No. 2971036
[PTL 2] Japanese Unexamined Patent Application Publication No. 2000-116342
[PTL 3] Japanese Patent No. 3405843
[PTL 4] Japanese Patent No. 3586686
[PTL 5] Japanese Unexamined Patent Application Publication No. 2007-209283
[PTL 6] Japanese Patent No. 5953024
[PTL 7] Japanese Unexamined Patent Application Publication No. H05-184282
[PTL 8] Japanese Unexamined Utility Model Application Publication No. S60-68989
[PTL 9] Japanese Patent Application No. 2013-218391
[PTL 10] International Patent Application Publication No. WO 2016/021717

SUMMARY OF THE INVENTION

Problems to be Solved by the Invention

The inventors conducted earnest studies to impart fruit-like, fruit flesh-like, and fruit skin-like mouthfeels further closer to that of a real fruit using, as a prototype, a gummy candy obtained by filling a collagen casing with a gel composition that is imparted with a predetermined fruit flavor. As a result, the inventors found that the mouthfeel (the mouthfeel of a fruit, fruit flesh, and skin) of a raw fruit that does not contain much fiber, such as a grape, can be obtained by imparting the mouthfeel of the tissues and skin of a fruit being broken down (disintegration characteristics) when the fruit with skin is masticated repeatedly.

With respect to the properties of the gel composition when creating the prototype gummy candy, the inventors carefully examined the following: for example, as the factors that affect a mouthfeel, increase in the water content in the gel composition and adjustment of the content of a gelling agent; as the factors that further improve a mouthfeel and enhance the preservability after production, the water migration ability of the solidified gel composition, and the correlation between the water migration ability and the casing; and as the factors that improve the production efficiency, prevention of casing breakage when filling the casing with the gel composition that has been heated to a relatively high temperature to dissolve the gelling agent. For example, if the water migration ability of the solidified gel composition is high, an initially designed mouthfeel is spoiled, and water exudes through the casing to the surface and an unpleasant feeling, e.g., stickiness, is often caused. In addition, it is considered that if the water migration ability of the gel composition is low, it will become difficult to impart a fruit skin-like mouthfeel to the casing, and the adhesion of the surface of the solidified gel composition with the casing will be reduced, and the integrated feeling when eaten will be lost.

Patent literatures 1 to 3 and 8 to 10 among the above-mentioned patent literatures are particularly related to the present invention. However, while patent literatures 1 to 3 describe gels (gel compositions) that contain gelling agents and to which fruit flavors are imparted, patent literatures 1 to 3 do not describe each property of the gel compositions mentioned above.

In patent literature 8, only gelatin or pectin is used as a gelling agent. There is no particular description regarding water content, and therefore, the water content in the jelly that is filled in a casing is assumed to be 10 to 20 wt. % based on the common general technical knowledge at the time of filing the application. Even if the jelly having such a composition is filled in a casing, the mouthfeel of a raw fruit with skin that has the combination of a fruit juice feeling, a fruit-like mouthfeel, a fruit flesh-like mouthfeel, and a fruit skin-like mouthfeel, and disintegration characteristics can't be reproduced. In addition, patent literature 8 indicates that the casing functions as skin but doesn't indicate that the casing has a mouthfeel of raw grape skin.

In patent literature 9, a gradual transition of gel strength when a plunger is inserted into the gummy candy of patent literature 9 was set to be equivalent to that of a grape, as an index for reproducing fruit flesh-like and skin-like mouthfeels close to those of a raw grape with skin. This gummy candy has an innovative mouthfeel close to the mouthfeel of a raw grape with skin. However, there is still room for further improvement in terms of the reproduction of the fruit juice feeling and the disintegration characteristics of a raw grape with skin, which is obtained upon repeatedly masticating raw grapes. In particular, addition of a sufficient amount of a gelling agent to a gummy candy is indispensable from the viewpoint of, for example, shape retainability and resistance to water caused by syneresis, but the elasticity from a gelling agent is completely different from the disintegration characteristics of fruit flesh upon being masticated. Therefore, it is considered that the disintegration characteristics are not reproduced sufficiently.

Patent literature 10 indicates that the syneresis, the stickiness, and the degree of plastic deformation of a gummy candy are further improved successfully by coating a high water content gummy candy containing a gelatin-based gelling agent with a casing. However, the tackiness and the gel strength are high, and the disintegration characteristics are not sufficiently reproduced. Thus, there is still room for further improvement in terms of imparting the mouthfeel of a raw grape with skin.

An object of the present invention is to provide a confectionery having a grape-like mouthfeel, i.e., a disintegration mouthfeel similar to that of a raw grape with skin.

Solution to the Problems

The present invention provides, as preferred embodiments, confectioneries having a grape-like mouthfeel according to embodiments (1) to (4) below.

(1) A confectionery having a grape-like mouthfeel, the confectionery including: a solidified gel composition; and a collagen casing coating the solidified gel composition, in which the solidified gel composition has a dynamic viscoelastic pattern similar to a dynamic viscoelastic pattern of a flesh of a raw grape.

(2) The confectionery having the grape-like mouthfeel according to (1) above, in which the solidified gel composition has the dynamic viscoelastic pattern, similar to the dynamic viscoelastic pattern of the flesh of the raw grape, in which a loss tangent value at an angular frequency of 63.1 rad/S decreases by 34 to 83% relative to a loss tangent value at an angular frequency of 3.98 rad/S.

(3) The confectionery having the grape-like mouthfeel according to (1) or (2) above, in which the solidified gel composition has a pH of 2 to 4, a moisture value of 20 to 45 weight %, and a moisture activity value of 0.6 to 0.86, and has a water migration ability in which water contained in the solidified gel composition exudes to a surface of the solidified gel composition, and a water migration rate of the solidified gel composition left standing for one week at 37° C. is 0.3 to 0.6 weight % and a water migration rate of the solidified gel composition left standing for two weeks at 37° C. is 0.6 to 1.5 weight %.

(4) The confectionery having the grape-like mouthfeel according to any one of (1) to (3) above, in which the collagen casing has a film thickness of 5 to 100 μm, and the collagen casing prepared in a manner that the solidified gel composition is coated by the collagen casing, dried at normal temperature for six hours, and removed from the collagen casing has a breaking strength of 2800 to 9000 g/cm$^2$.

In these embodiments, a solidified gel composition denotes a composition obtained by heating and dissolving a gelling agent, a polysaccharide thickener, and other components contained in a gel composition in water, and solidifying the resultant liquid gel composition by, for example, cooling. The heating temperature for the heating and dissolving can be selected as appropriate according to the types of the gelling agent and the polysaccharide thickener.

Advantageous Effects of the Invention

According to the present invention, a confectionery having a grape-like mouthfeel, i.e., a disintegration mouthfeel similar to that of a raw grape with skin, is provided.

BRIEF DESCRIPTION OF THE DRAWINGS

FIG. 1 is a graph showing dynamic viscoelastic patterns of Reference examples, Examples, and Comparative Examples, where the horizontal axis represents angular frequency (rad/S) and the vertical axis represents loss tangent value (tan δ).

DESCRIPTION OF EMBODIMENTS

The inventors studied ways to impart the mouthfeel of a raw grape with skin (disintegration characteristics) can be reproduced almost accurately by imparting the mouthfeel (disintegration characteristics) obtained at the time when a grape with skin is masticated repeatedly to the above-mentioned prototype gummy candy, based on the above-mentioned finding that the mouthfeel of a raw grape with skin. The inventors first focused on the reproduction of the gel strength of a raw grape with skin described in patent literature 9. However, the above prototype gummy candy had a mouthfeel dominated by the elasticity derived from a gelling agent, and sufficient disintegration characteristics at the time of mastication could not be imparted only by reproducing the gradual transition of the gel strength of a raw grape with skin.

The inventors conducted further investigation and found that the disintegration characteristics of a grape with skin when it is masticated repeatedly can be imparted by approximating the dynamic viscoelastic pattern (preferably a loss tangent value tan δ at a specified angular frequency) of the gel composition filled in the casing to the dynamic viscoelastic pattern of a raw grape with skin, without imparting excess elasticity derived from a gelling agent even if the gel composition contains a gelling agent. Furthermore, the inventors found that the mouthfeel of a grape with skin can be reproduced more accurately in the prototype gummy candy above by adjusting the water migration rate of the gel composition.

In other words, in a preferred embodiment of the present invention, the fruit juice feeling and mouthfeel of a raw grape with skin (a mouthfeel as a whole fruit, a fruit flesh mouthfeel, disintegration characteristics, and a fruit skin mouthfeel) can be reproduced almost accurately in the prototype gummy candy by approximating the dynamic viscoelastic pattern of the gel composition of the prototype gummy candy to that of the flesh of a raw grape. In a preferred embodiment of the present invention, the fruit juice feeling and mouthfeel of a raw grape with skin can be reproduced more accurately by approximating the loss tangent value tan δ at a specified angular frequency of the gel composition to that of the flesh of a raw grape. In a further preferred embodiment of the present invention, the fruit juice feeling and mouthfeel of a raw grape with skin can be reproduced even more accurately by approximating the dynamic viscoelastic pattern (preferably a loss tangent value tan δ at a specified angular frequency) of the gel composition to that of the flesh of a raw grape and adjusting the water migration rate of the gel composition.

According to the preferred embodiments where the gel composition is adjusted to have a predetermined dynamic viscoelastic pattern and a predetermined water migration rate, a confectionery or a gummy candy that has a mouthfeel such as the fruit juice feeling and the disintegration characteristics of a raw grape with skin when masticated repeatedly is provided.

In the following, embodiments of the present invention are described in detail.

A confectionery that has a grape-like mouthfeel (hereinafter, also referred to as a "grape-like confectionery") in this embodiment includes a solidified gel composition and a collagen casing coating the solidified gel composition. In this embodiment, the outer surface of the solidified composition is in close contact with the inner surface of the collagen casing substantially at the entire surfaces. However, very small parts of the solidified composition may not be in contact with the collagen casing in some cases. The grape-like confectionery in the present embodiment has a fruit juice feeling and a mouthfeel similar to those of a raw grape with skin. The grape-like confectionery in the present embodiment is preferably a gummy candy having the fruit juice feeling and mouthfeel of a raw grape with skin (hereinafter, also referred to as a "grape-like gummy candy").

In the investigation of the dynamic viscoelasticity of the flesh of a raw grape based on an angular frequency and a loss tangent value, the inventors found that the flesh has a dynamic viscoelastic pattern in which the loss tangent value decreases as the angular frequency increases. The inventors assumed that decrease in the loss tangent value of the flesh of a raw grape may be used as the index for the disintegration characteristics and conducted further studies to impart this dynamic viscoelastic pattern to the gel composition. The inventors found that a dynamic viscoelastic pattern is set based on the loss tangent value at two predetermined angular frequencies, thereby imparting the disintegration characteristics of a raw grape with skin when it is masticated to the gummy candy with suppressing the emergence of the elasticity derived from a gelling agent. In this embodiment, the dynamic viscoelastic pattern of the gel composition is set based on the loss tangent value at angular frequencies of 3.98 rad/S and 63.1 rad/S.

More specifically, the solidified gel composition in the first embodiment has a dynamic viscoelastic pattern in which the loss tangent value at an angular frequency of 63.1 rad/S (hereinafter, also referred to as "tan δ 63.1") decreases by 34 to 83% relative to the loss tangent value at an angular frequency of 3.98 rad/S (hereinafter, also referred to as "tan δ 3.98"). In other words, the decrease rate, in percentage, of tan δ 63.1 relative to tan δ 3.98 ([tan δ 63.1/tan δ 3.98]×100) is 34 to 83%. The dynamic viscoelastic pattern of the flesh of a raw grape is as follows: tan δ 3.98 is 0.175, tan δ 63.1 is 0.0413, and the decrease rate is about 76%. Therefore, the dynamic viscoelastic pattern in the present embodiment is substantially approximate to the dynamic viscoelastic pattern of the flesh of a raw grape.

When the decrease rate is 34 to 83%, the elasticity derived from a gelling agent is not prominent more than necessary, and a disintegration mouthfeel in which the solidified gel composition is gradually disintegrated without being divided into several small pieces during mastication, can be obtained. When the decrease rate is less than 34%, the elasticity derived from a gelling agent becomes relatively prominent, and the disintegration of the solidified composition might not progress enough to give the disintegration feeling similar to that of a raw grape with skin. The mouthfeel may be closer to the mouthfeel of chewing general gummy candies. When the decrease rate is over 83%, the solidified gel composition may melt and disappear in the mouth quickly, and only a collagen casing often remains. As a result, the disintegration characteristics of the solidified composition integrated with the collagen casing might not be obtained.

Herein, the dynamic viscoelastic pattern of the gel composition or the flesh of a raw grape was obtained as follows. First, the storage modulus (G') and loss modulus (G") of a sample were measured at each angular frequency (rad/S) at 25° C. using a rheometer (product name: Physico MCR 301 manufactured by Anton Paar GmbH). Next, the results were analyzed with analysis software (software name: RHEO-PLUS/32 ver. 2.66) to obtain a tangent loss value (tan δ) at each angular frequency.

The samples for measuring dynamic viscoelastic patterns were made as follows. A disc (thin cylindrical object) having a thickness of about 5 mm and a diameter of 12 mm was cut out from a center portion of the flesh or the solidified gel composition with use of a sharp cutter (a cutter knife in this embodiment) that does not affect the dynamic viscoelastic pattern, and the disc was used as the sample for measuring the dynamic viscoelastic pattern. For each specimen, five samples as per the above were made, in consideration of the variation in sample preparation. Tangent loss values were calculated for the respective samples, and the arithmetic mean value thereof was obtained.

A preferred solidified gel composition in the second embodiment has a predetermined water migration ability that causes the water contained in the solidified gel composition to exude to the surface of the composition. It is considered that the water exuded to the surface of the solidified composition is absorbed by the collagen casing and/or exists at an interface between the solidified composition and the collagen casing. As a result, when the grape-like confectionery in this embodiment is masticated, the integrated feeling of the solidified composition and the collagen casing as well as the fruit skin-like mouthfeel, the fruit juice feeling, and the like of the confectionery further improve, and the mouthfeel of a raw grape with skin can be reproduced more accurately. Hereinafter, the water exuded to the outer surface of the solidified gel composition is also referred to as a syneresis liquid of the solidified composition or simply as a syneresis liquid.

More specifically, as for the water migration ability, the water migration rate after the grape-like confectionery is stored at 37° C. for one week (hereinafter, also referred to as "water migration rate after one week") is 0.3 to 0.6 wt. % and the water migration rate after the confectionery is stored at 37° C. for two weeks (hereinafter, also referred to as "water migration rate after two weeks") is 0.6 to 1.5 wt. %.

The water migration rate (wt. %) is calculated using the following equation:

Water migration rate($wt.\%$)=[($X0$−$X1$)/$X0$]×100

[where X0 is the weight of the grape-like confectionery immediately before the confectionery is stored, and X1 is the weight of the grape-like confectionery measured immediately after the grape-like confectionery has been stored for one or two weeks.]

The water migration rate is 0.3 to 0.6 wt. % after one week and 0.6 to 1.5 wt. % after two weeks. Accordingly, the unpleasant stickiness of the grape-like confectionery in the present embodiment when the confectionery is picked up by hand is prevented, and hardening of the mouthfeel due to water migration does not occur. Thus, the fruit juice feeling of a raw grape with skin on the tongue can be obtained.

If the water migration rate after one week is less than 0.3 wt. %, the collagen casing does not swell sufficiently, and the strength required for a fruit skin-like mouthfeel might not be obtained. This causes a hard mouthfeel similar to that of a sausage to be likely obtained. If the water migration rate is over 0.6 wt. %, excess water migration occurs. This could cause unpleasant stickiness, and hardening of the mouthfeel due to the reduction in the moisture value of the solidified gel composition. Also when the water migration rate after two weeks is less than 0.6 wt. % or over 1.5 wt. %, the same problems that occur when the water migration rate after one week is less than 0.3 wt. % or over 0.6 wt. % could occur.

A preferred gel composition and the solidified material of the gel composition in the third embodiment have a pH, a moisture value, and a moisture activity value within predetermined ranges. The pH can be in a range of, for example, 2 to 4 or 2 to 3.5. The moisture value (water content) can be in a range of, for example, 20 to 45 wt. %, 23 to 40 wt. %, 25 to 40 wt. %, or 25 to 38 wt. %. The moisture activity value can be in a range of, for example, 0.6 to 0.86, over 0.6 and less than or equal to 0.86, or 0.7 to 0.86. The pH, the moisture value, and the moisture activity value can have several possible ranges respectively, and the ranges may be combined appropriately. There are 24 combinations in total.

The growth of microorganisms such as mold, yeast, and bacteria can be significantly inhibited by adjusting the pH, the moisture value, and the moisture activity value within any of the respective ranges above. The preservability of the grape-like confectionery or gummy candy of the present embodiment can also be enhanced. In addition, when the gel composition and the solidified material of the gel composition have a pH, a moisture value, and a moisture activity value within the ranges above, the water absorbed by the collagen casing and the water accumulated between the solidified composition and the collagen casing are likely to have a pH and a moisture activity value within or nearly within the ranges above. As a result, the preservability of the collagen casing can also be enhanced. Therefore, the preservability of the whole grape-like confectionery or gummy candy can be enhanced, and the best before date and the expiration date of the confectionery or gummy candy can be extended.

In addition, if at least one of the pH, the moisture value, and the moisture activity value of the solidified gel composition in the third embodiment exceeds the upper limits of the ranges (pH=4, moisture value=45 wt. %, moisture activity value=0.86), suppression of the growth of microorganisms could become difficult. Therefore, microorganisms could grow in most of the solidified gel compositions, and the compositions could putrefy within one week. If at least one of the pH, the moisture value, and the moisture activity value of the solidified gel composition in the third embodiment is lower than the lower limits of the ranges (pH=2, moisture value=20 wt. %, moisture activity value=0.6), the water migration ability of the solidified composition could decrease. This prevents the collagen casing from swelling sufficiently, which is likely to cause a hard mouthfeel similar to that of a sausage. When the moisture value is less than 20 wt. %, which is a level similar to the moisture value of commercially available gummy candies, the elasticity from a gelling agent becomes strong. Therefore, a grape-like confectionery or gummy candy having a mouthfeel similar to that of a raw grape with skin cannot be obtained.

Herein, the moisture activity value was measured using a moisture activity thermostatic measuring device (product name: LabMASTER-aw BASIC, manufactured by Novasina AG) at 25° C. The pH was measured using a pH meter (manufactured by HORIBA, Ltd.). As for the measurement method, 5 g of a sample was dissolved in 100 g of hot water (pH=7) at 80° C., the mixture was cooled to 25° C., and measurement was performed. The pH value of the sample was obtained by converting the obtained measurement value.

The gel composition in the first to the third embodiments described above can be used alone or by combining the first and the second embodiments, the first and the third embodiments, the second and the third embodiments, or the first to the third embodiments depending on the design of the targeted grape-like confectionery or gummy candy.

The gel compositions in the first to the third embodiments contain components such as at least one type selected from the group consisting of gelling agent and polysaccharide thickener; saccharide; glycerin; acidulant; additive; and water. The gel compositions in the respective forms may additionally contain, for example, a salt. The gel compositions in the first to the third embodiments can be obtained by selecting the type and content of each component appropriately. The details of each component are as follows.

A gelling agent and a polysaccharide thickener impart, for example, a predetermined elasticity to the gel composition. It is considered that the close contact between the outer surface of the solidified gel composition and the inner surface of the collagen casing causes at least one type of the gelling agent and the polysaccharide thickener in the solidified composition to act in conjunction with glycerin to change the mouthfeel of the collagen casing to a mouthfeel similar to that of a raw fruit skin.

A gelling agent commonly used in the food industry can be used. Examples of the gelling agent include: an agar; a gelatin; and gums such as gum arabic, gellan gum, deacylated gellan gum, native gellan gum, xanthan gum, locust bean gum, psyllium seed gum, guar gum, tamarind seed gum, tamarind gum, tara gum and tragacanth gum. The gelling agent can be used individually, or in combination of two or more types. A polysaccharide thickener commonly used in the food industry can be used. Examples of the polysaccharide thickener include furcellaran, carrageenan, pectin, curdlan, soybean polysaccharide, alginic acid, carboxymethylcellulose, glucomannan, and the like. The polysaccharide thickener can be used individually, or in combination of two or more types. Among these, the gelling agent is preferable, and the use of the gelling agent alone is more preferable in terms of reproducing the mouthfeel (including disintegration characteristics) and the fruit juice feeling of a raw grape with skin.

The content of the gelling agent and/or the polysaccharide thickener in the gel composition in the embodiment is not limited to a particular amount and can be selected from a wide range in accordance with the type of gelling agent and/or polysaccharide thickener. However, the content is, for example, in the range of 0.5 to 15 wt. %, 1 to 15 wt. %, or 2 to 15 wt. % of the total weight of the gel composition. The narrower the range is, the higher chance to obtain a good result for achieving the object of the present invention. Examples of preferable use forms of the gelling agent include the combination use of the gelatin and the gum and the single use of the gum. When the gum is used in these use forms, combining two or more types is preferable.

For the combination use of the gelatin and the gum and the single use of the gum, the contents of the gelatin and the gum can be appropriately selected from the respective ranges above. For the combination use, as examples of more specific ranges, the content of the gelatin can be selected from the range of 0.1 to 2.5 wt. % or 0.3 to 2.2 wt. % of the total weight of the gel composition, and the content of the gum can be selected from the range of 1.5 to 5 wt. % or 2 to 4.5 wt. % of the total weight of the gel composition. For the single use of the gum, the content of the gum can be selected from the range of 1.8 to 10 wt. % or 2 to 6 wt. % of the total weight of the gel composition.

Any saccharide traditionally used in gummy candies can be used. Examples of the saccharide include: monosaccharide such as glucose and fructose; disaccharide such as sucrose, lactose, and trehalose; sugar alcohol such as maltitol, lactitol, sorbitol, mannitol, xylitol, erythritol, glycerin, reduced starch hydrolyzate (saccharified reduced starch), palatinit (trade name), palatinose (trade name), and reduced palatinose (trade name); oligosaccharide such as raffinose, stachyose, reduced xylooligosaccharide, reduced branched oligosaccharide, fructo-oligosaccharide, inulooligosaccharide, galactooligosaccharide, isomaltooligosaccharide, maltooligosaccharide, lactosucrose, xylooligosaccharide, soybean oligosaccharide, and palatinoseoligosaccharide; liquid sugar such as starch syrup, reduced starch syrup, enzyme starch syrup, fructose glucose liquid sugar, and glucose liquid sugar; and dietary fiber such as digestion resistant dextrin and a polydextrose. Among these saccharides, if the content of the monosaccharide, the disaccharide, or the like is increased, good fruit-like sweetness can also be imparted to the grape-like confectionery or gummy candy in the present embodiment. The saccharide can be used individually, or in combination of two or more types. The content of the saccharide in the gel composition is not limited to a particular amount. However, in terms of reproducing the mouthfeel and the fruit juice feeling of a raw grape with skin, the content is selected from the range of, for example, 30 to 75 wt. %, 40 to 70 wt. %, or 45 to 65 wt. % of the total weight of the gel composition.

It is considered that glycerin changes, for example, the mouthfeel of the collagen casing to a fruit skin-like mouthfeel as described above. The glycerin content is selected from the range of 3 to 15 wt. %, 4 to 12 wt. %, or 6 to 12 wt. % of the total weight of the gel composition. When the glycerin content is in a range of, for example, 3 to 15 wt. %, the gel composition containing glycerin and the gelling agent and/or the polysaccharide thickener acts on the collagen casing to change the mouthfeel of the collagen casing to a fruit skin-like mouthfeel without impairing the fruit flavor in the grape-like confectionery or gummy candy of the present embodiment. In addition, the fruit-like mouthfeel that the skin and the fruit flesh are integrated with each other can be obtained. Among the three ranges above, narrower ranges relatively often yield good results, in terms of almost accurate reproduction of the fruit juice feeling and the mouthfeel (including disintegration characteristics) of a raw grape with skin.

When the glycerin content is less than 3 wt. %, a fruit skin-like mouthfeel might not be imparted to the collagen casing. Meanwhile, when the glycerin content is over 15 wt. %, a fruit skin-like mouthfeel cannot be imparted to the collagen casing and the flavor derived from glycerin becomes too strong, and thus, the flavor and mouthfeel of the grape-like confectionery or gummy candy in the present embodiment may be impaired.

Any acidulant traditionally used in the food industry can be used. Examples of the acidulant include citric acid, malic acid, tartaric acid, lactic acid, acetic acid, and phytic acid. Fruit juice or the like that contains the acidulant above may be used as an acidulant. The acidulant can be used individually, or in combination of or two or more types. The acidulant content in the gel composition can be selected appropriately in accordance with the pH set to the composition.

Any additive traditionally used in gummy candies can be used. Examples of the additive include: fruit juice such as natural fruit juice, concentrated fruit juice, or dried powder of fruit juice; starch; a modified starch; a natural material; a coloring; a flavoring; and an edible pigment. Among these, fruit juice such as natural fruit juice, concentrated fruit juice, or dry powder of fruit juice is preferable. The additive is used to further improve the mouthfeel, the smell, the appearance, and the like of the gel composition and the grape-like confectionery or gummy candy in the present embodiment. The additive can be used individually, or in combination of two or more types.

Addition of a salt to the gel composition may be used as means, for example, for decreasing the moisture activity of the gel composition or for solidifying the gel composition. Any inorganic and organic salt commonly used in the food industry can be used. Specific examples of the salt include nitrites, ascorbates, aspartates, acesulfame potassium, sulfites, arginine-glutamates, benzoates, inosinates, uridylates, ethylenediamine tetraacetate, erythorbates, chloride salts, oleates, guanylates, citrates, glycyrrhizinates, gluconates, glutamates, succinates, chondroitin sulfate, acetates, saccharin salts, oxide salts, hyposulfites, cysteine hydrochlorides, cytidylates, bromates, tartrates, nitrates, hydroxide salts, stearates, sorbates, carbonates, thiamine hydrochloride, lactates, pantothenates, histidine hydrochloride, phosphates, propionates, sulfates and malates. The salt can be used individually, or in combination of two or more types.

The water content (moisture value) of the gel compositions in the first to the third embodiments are, for example, 20 to 45 wt. %, 23 to 40 wt. %6, 25 to 40 wt. %, or 25 to 38 wt. % of the total weight of the gel composition. When the water content is adjusted within a range of 20 to 45 wt. %, the mouthfeel of the flesh of a raw grape can be imparted to the gel composition, adjusting the moisture activity value of the gel composition within a range of 0.6 to 0.86 is facilitated, and the distributability of the grape-like confectionery or gummy candy in the present embodiment at normal temperature can be improved.

The gel composition in the first to the third embodiments includes, as one example, 0.5 to 15 wt. % (or 1 to 15 wt. % or 2 to 15 wt. %) of at least one type selected from the group consisting of the gelling agent and the polysaccharide thickener (or a combination of the gelling agent, the gelatin, and the gum, a combination of the gelling agent and the gum, a combination of the gelatin and the gum, or the gum alone), 30 to 75 wt. % (or 40 to 70 wt. % or 45 to 65 wt. %) of the saccharide, 3 to 15 wt. % (or 4 to 12 wt. % or 6 to 12 wt. %) of glycerin, 20 to 45 wt. % (or 23 to 40 wt. %, 25 to 40 wt. %, or 25 to 38 wt. %) of water, the acidulant, and the additive (or fruit juice), with or without the salt, the gel composition having a pH of 2 to 4 (or 2 to 3.5) and a moisture activity value of 0.6 to 0.86 (or greater than 0.6 and not greater than 0.86, or 0.7 to 0.86). The ranges of the content of each component above is in percent by weight based on the total weight of the gel composition.

The gel compositions having the predetermined characteristics of the first to the third embodiments are prepared by appropriately selecting the content of each component in the gel compositions, as described above. Other methods for obtaining the characteristic of the gel composition in the first embodiment (the dynamic viscoelastic pattern similar to that of the flesh of a raw grape, in particular, the dynamic viscoelastic pattern in which tan δ 63.1 decreases by 34 to 83% relative to tan δ 3.98) and/or the characteristic of the gel composition in the second embodiment (the water migration rate after one week being 0.3 to 0.6 wt. %, and the water migration rate after two weeks being 0.6 to 1.5 wt. %) include a method in which the metal ion content in the gel composition is adjusted.

In the present embodiment, especially when, as a component of the gel composition, a component derived from a natural product is used or at least one type of the organic salt and the inorganic salt is used, such a component, organic salt, or inorganic salt may contain metal ions in some cases. Therefore, the metal ion content of each component used may be measured in advance, and then the blending ratio between components may be adjusted so that a predetermined metal ion content is achieved. Alternatively, the metal ion content of the resultant gel composition may be measured, and then the type and/or amount of metal ion required may be further added on the basis of the result. Also, the metal ion content in the gel composition obtained in a preliminary experiment may be measured, and the blending ratio between components may be appropriately adjusted on the basis of the result.

The methods for adjusting the metal ion content include, for example, a method in which a metal salt of an organic acid described above is used as the acidulant, a method in which an additive containing a metal salt or metal ions is used, and a method in which at least one type selected from the group consisting of the inorganic salt and the organic salt described above is used. The additive containing a metal salt or metal ions is preferably an additive derived from natural products, and examples thereof include a gelling agent derived from natural products and fruit juice. If an additive derived from natural products is used, the content of the metal salt and/or metal ions may be measured by instrumental analysis or the like as described above before the additive is used. As for these methods, a single method may be performed, or two or more methods may be performed in combination.

In terms of obtaining the characteristics of the first and second embodiments, it is preferable to adjust the contents of, for example, ions of alkali metals such as K and Na and ions of alkaline earth metals such as calcium and magnesium so as to be within predetermined ranges. Specific methods for adjusting the metal ion content include: a first method in which the weight ratio between Na ions and K ions is set to be in a range of K ions:Na ions=1.5 to 4:1; a second method in which the K ion content is set to be 4 to 20 mmol/kg, and the weight ratio between Na ions and K ions is set to be in a range of K ions:Na ions=1.5 to 4:1; and a third method in which the weight ratio of K ions to the total weight of Ca ions and Mg ions is set such that K ions:(Ca ions+Mg ions)=2 to 7:1. Any of the first to the third methods, a combination of the first and the third methods, and a combination of the second and the third methods can be applied to the gel composition in each of the first, the second, and the third embodiments, the gel composition made by combining the first and the second embodiments, the gel composition made by combining the first and the third embodiments, the gel composition made by combining the second and the third embodiments, and the gel composition made by combining the first to the third embodiments.

Any commercial product that contains collagen or collagen and cellulose can be used as a collagen casing that coats and includes the solidified gel composition therein. However, the collagen casing that contains collagen and cellulose is preferred considering the adhesion of the outer surface of the solidified gel composition to the casing. The collagen content in the collagen casing is 20 to 90 wt. % or 40 to 80 wt. % of the total weight of the collagen casing. In terms of the adhesion to the outer surface of the solidified gel composition as well as prevention of poor solubility and an unpleasant mouthfeel, the collagen casing that has a collagen content of 40 to 80 wt. % and a cellulose content not greater than 10 wt. % is more preferable. In terms of flexibility, ease of handling (workability), stability (such as resistance to breakage), and the like, the collagen casing may also contain one or more types of, for example: vegetable oil and fat such as palm oil, olive oil, coconut oil, and palm kernel oil; a plasticizer such as glycerin; and a stabilizer, in addition to collagen and cellulose.

Adjusting the film thickness and/or the strength (or the film thickness and the strength) of the collagen casing can make the mouthfeel of the grape-like confectionery or gummy candy in the present embodiment even closer to the mouthfeel of a raw grape with skin (especially a fruit skin mouthfeel). The film thickness is selected from a range of, for example, 5 to 100 μm or 25 to 50 μm. The strength is selected from a range of, for example, 2800 to 9000 $g/cm^2$ or 3000 to 5000 $g/cm^2$. The strength here denotes the strength obtained by measuring only a collagen casing according to the method described below. The collagen casing is obtained by coating the solidified gel composition with the collagen casing, drying the coated solidified gel composition at normal temperature (here, room temperature of 20 to 25° C.) for six hours, and then removing the solidified composition. Collagen casings with a variety of film thicknesses are commercially available. Any of the commercially available collagen casings that have the strength in the ranges above when filled with the solidified gel composition can be used. The gel composition may be in any of the following forms: the first embodiment; the second embodiment; the third embodiment; a combination of the first and the second embodiments; a combination of the first and the third embodiments; a combination of the second and the third embodiments; and a combination of the first to the third embodiments. The film thickness of the collagen casing herein is an arithmetic mean value of thicknesses measured at 10 points using a micrometer (product name: MDC25MJ, manufactured by Mitutoyo Corporation).

It is considered that the strength in the ranges above can be obtained by causing the solidified gel composition to be included within the collagen casing that has a film thickness in the ranges above. That is, it is considered that the collagen casing of the grape-like confectionery or gummy candy in the present embodiment absorbs the syneresis liquid from the solidified gel composition, thereby becoming swollen, whereby the strength of the collagen casing is reduced compared to that of the collagen casing not coating the solidified gel composition, and thus, a good fruit skin mouthfeel can be obtained. Since the collagen casing has voids therein, it is considered that the swelling is caused by the ingress of the syneresis liquid into the voids.

When the film thickness of the collagen casing is less than 5 μm, the strength of the collagen casing when the grape-like confectionery or gummy candy in the present embodiment is masticated becomes less than 2800 $g/cm^2$, repeated mastication of the grape-like confectionery or gummy candy becomes difficult, and a fruit skin mouthfeel might not be obtained. In addition, the collagen casing may break when filled with a heated liquid gel composition. When the film thickness of the collagen casing is over 100 μm, the strength of the collagen casing becomes greater than 9000 $g/cm^2$, which could lead to an insufficient swelling of the collagen casing with the syneresis liquid from the solidified gel composition. As a result, a good fruit skin-like mouthfeel might not be obtained.

The grape-like confectionery or gummy candy in the present embodiment can be obtained by, for example, heating the gel composition to dissolve each component such as a gelling agent, filling the collagen casing with the resultant liquid gel composition, twisting both ends of the collagen casing at a predetermined length, cooling to solidify the gel composition in the collagen casing, and cutting the twisted parts.

The resultant grape-like confectionery or gummy candy in the present embodiment has a raw-grape-like skin mouthfeel, a fruit flesh mouthfeel, and a grape-like mouthfeel in which the skin and the flesh are integrated with each other. Also, the grape-like confectionery or gummy candy exhibits a grape-like succulent mouthfeel and flavor when further masticated repeatedly. In addition, the grape flavor of the grape-like confectionery or gummy candy in the present embodiment can be changed to another flavor while the mouthfeel of a raw grape with skin is retained. The other flavor is not especially limited to a particular flavor as long as the flavor can impart a taste and a smell. Examples of the flavor include: fruits other than grape such as strawberry, kiwi, pineapple, blueberry, mango, peach, apple, cherry, and citrus; beverages such as cider, cola, ramune, matcha green tea, jasmine, black tea, green tea, oolong tea, coffee, and milk coffee; foods that have flavors of rose or other flowers; fried chicken, garlic; chocolate; and the like.

EXAMPLES

Next, the present invention is further described by use of examples, but the present invention is not limited to the examples. In the following, unless otherwise specified, parts and % denote parts by weight and weight (wt.) %, respectively. A grape-like confectionery in each example is also a grape-like gummy candy.

Example 1

A gel composition was made by mixing 30% of water, 1.6% in total of native gellan gum and deacylated type gellan gum, 1.4% of locust bean gum, 0.8% of 250 bloom gelatin, 6.0% of glycerin, and 45% in total of sugar and starch syrup, heating and stirring the mixture to 95° C., and then adding and stirring 1.8% of acidulant, 13.3% of six times concentrated grape juice, and 0.1% of flavoring. This gel composition had a pH of 2.51, a moisture value of 30%, and a moisture activity value of 0.785. The composition was filled into a collagen casing having a film thickness of 35 μm with use of a filling machine, and then naturally cooled by drying at normal temperature for six hours. The dried composition was covered with a brightening agent to make a grape-like confectionery or grape-like gummy candy.

The metal ion content in the resultant gel composition was measured by, for K ions and Na ions, atomic absorption spectrophotometry, and for Ca ions and Mg ions, inductively coupled plasma (ICP) spectrometry. The gel composition contained 9.3 mmol/kg of K ions, 3.5 mmol/kg of Na ions, and 3.6 mmol/kg in total of Ca and Mg ions, and satisfied the following ranges. K ions:Na ions=1.5 to 4:1, and K ions:(Ca ions+Mg ions)=2 to 7:1. K ions were mainly from the acidulant (potassium citrate, potassium polyphosphate), Na ions were mainly from the acidulant (sodium citrate), and Ca ions and Mg ions were from the fruit juice. Three types of acidulant were mixed and used in this Example.

Example 2

A gel composition was made by mixing 25% of water, 1.7% in total of native gellan gum and deacylated type gellan gum, 1.3% of locust bean gum, 1.1% of psyllium seed gum, 7.0% of glycerin, and 47.7% in total of sugar and starch syrup, heating and stirring the mixture to 95° C., and then adding and stirring 1.9% of acidulant, 14.3% of six times concentrated grape juice, and 0.1% of flavoring. This gel composition had a pH of 2.34, a moisture value of 25%, and a moisture activity value of 0.748. The composition was filled into a collagen casing having a film thickness of 35 μm with use of a filling machine, and then naturally cooled by drying at normal temperature for six hours. The dried composition was covered with a brightening agent to make a grape-like confectionery or grape-like gummy candy.

Example 3

A gel composition was made by mixing 40% of water, 1.4% in total of native gellan gum and deacylated type gellan gum, 1.0% in total of locust bean gum and xanthan gum, 5.0% of glycerin, and 43% in total of sugar and starch syrup, heating and stirring the mixture to 95° C., and then adding and stirring 1.7% of acidulant, 7.8% of six times concentrated grape juice, and 0.1% of flavoring. The gel composition had a pH of 2.41, a moisture value of 40%, and a moisture activity value of 0.843. The composition was filled into a collagen casing having a film thickness of 35 μm with use of a filling machine, and then naturally cooled by drying at normal temperature for six hours. The dried composition was covered with a brightening agent to make a grape-like confectionery or grape-like gummy candy.

Example 4

A gel composition was made by mixing 45% of water, 1.8% in total of native gellan gum and deacylated type gellan gum, 0.8% in total of locust bean gum and xanthan gum, 0.5% of 250 bloom gelatin, 4.3% of glycerin, and 39% in total of sugar and starch syrup, heating and stirring the mixture to 95° C., and then adding and stirring 1.7% of acidulant, 6.8% of six times concentrated grape juice, and 0.1% of flavoring. This gel composition had a pH of 2.52, a moisture value of 45%, and a moisture activity value of 0.853. The composition was filled into a collagen casing having a film thickness of 35 μm with use of a filling machine, and then naturally cooled by drying at normal temperature for six hours. The dried composition was covered with a brightening agent to make a grape-like confectionery or grape-like gummy candy.

With respect to the resultant gel compositions obtained in Examples 2 to 4, metal ions were analyzed five times by the same methods as those used in Example 1. The following ranges were satisfied. K ions:Na ions=1.5 to 4:1 and K ions:(Ca ions+Mg ions)=2 to 7: 1. Three types of acidulant were also used in Example 2 to 4 as in Example 1.

Comparative Example 1

A gel composition was made by mixing 30% of water, 1.6% in total of native gellan gum and deacylated type gellan gum, 0.8% of locust bean gum, 0.6% of psyllium seed gum, 2.6% of 250 bloom gelatin, 7.0% of glycerin, and 44% in total of sugar and starch syrup, heating and stirring the mixture to 95° C., and then adding and stirring 1.8% of acidulant (a mixture of citric acid and polyphosphoric acid), 11.5% of six times concentrated grape juice, and 0.1% of flavoring. This gel composition had a pH of 2.32, a moisture value of 30%, and a moisture activity value of 0.714. The composition was filled into a collagen casing having a film thickness of 35 μm with use of a filling machine, and then naturally cooled by drying at normal temperature for six hours. The dried composition was covered with a brightening agent to make a grape flavored confectionery.

Comparative Example 2

A gel composition was made by mixing 45% of water, 1.4% in total of native gellan gum and deacylated type gellan gum, 0.7% of locust bean gum, 5.1% of glycerin, and 38.5% in total of sugar and starch syrup, heating and stirring the mixture to 95° C. and then adding and stirring 1.7% of acidulant (a mixture of citric acid and polyphosphoric acid), 7.5% of six times concentrated grape juice, and 0.1% of flavoring. This gel composition had a pH of 2.75, a moisture value of 45%, and a moisture activity value of 0.872. The composition was filled into a collagen casing having a film thickness of 35 μm with use of a filling machine, and then naturally cooled by drying at normal temperature for six hours. The dried composition was covered with a brightening agent to make a grape flavored confectionery.

Test Example 1

According to the methods for measuring the dynamic viscoelasticity described above, with respect to commercially available grapes with skin (seedless Kyoho) A and B (Reference Examples 1, 2), and the grape-like confectioneries of Examples 1 to 4 and Comparative Examples 1 and 2, a loss tangent value (tan δ) at each angular frequency (rad/S) and the decrease rate (%) of tan δ 63.1 to tan δ 3.98 were obtained to study the dynamic viscoelastic pattern. The results are shown in table 1 and FIG. 1. The time periods since the commercially available grapes with skin (seedless Kyoho) A and B of Reference Examples 1 and 2 were placed on sale were confirmed to be within one week.

TABLE 1

| | | Reference Example | | Example | | | | Comparative Example | |
|---|---|---|---|---|---|---|---|---|---|
| | | 1 | 2 | 1 | 2 | 3 | 4 | 1 | 2 |
| Angular frequency rad/S | 100 | 0.080 | 0.0236 | 0.0252 | 0.0694 | 0.0496 | 0.048 | 0.122 | 0.0106 |
| | 63.1 | 0.104 | 0.0413 | 0.0338 | 0.109 | 0.0807 | 0.075 | 0.177 | 0.0104 |
| | 39.8 | 0.126 | 0.0732 | 0.0618 | 0.166 | 0.141 | 0.123 | 0.234 | 0.0252 |
| | 25.1 | 0.137 | 0.105 | 0.112 | 0.222 | 0.210 | 0.181 | 0.273 | 0.0423 |
| | 15.8 | 0.143 | 0.131 | 0.161 | 0.253 | 0.259 | 0.224 | 0.282 | 0.0693 |
| | 10 | 0.146 | 0.147 | 0.167 | 0.241 | 0.281 | 0.230 | 0.267 | 0.0856 |
| | 6.31 | 0.149 | 0.160 | 0.172 | 0.230 | 0.287 | 0.230 | 0.255 | 0.0985 |
| | 3.98 | 0.159 | 0.175 | 0.192 | 0.230 | 0.316 | 0.246 | 0.252 | 0.116 |
| Decrease rate (%) | | 34.59 | 76.40 | 82.40 | 52.46 | 74.46 | 69.72 | 29.76 | 91.03 |

As shown in Table 1 and FIG. 1, in Examples 1, 3, and 4, and Reference Examples 1 and 2, the decrease rates of tan δ 63.1 to tan δ 3.98 were in a range of 34 to 83%. The tan δ successively decreased within the range, and similar mouthfeels (disintegration characteristics) could also be obtained when the gel compositions were actually eaten.

In Example 2 and Comparative Example 1, the loss tangent values increased until 15.8 rad/S, the behaviors of which were different from those of Reference Examples 1 and 2. However, in Example 2, a sharp decrease in the loss tangent value was observed over 15.8 rad/S and the decrease rate was almost the same as that in Reference Examples 1 and 2 in the end. It is supposed that this phenomenon happens when a large amount of a gelling agent or a polysaccharide thickener, which yields a solidified composition having strong stiffness is contained. Also, Example 2 is considered to satisfy the conditions for the mouthfeel realized when a raw grape with skin is masticated repeatedly, because the loss tangent value of Example 2 significantly decreases when the angular frequency is successively increased. The grape-like confectionery of Example 2 when eaten reproduced the mouthfeel of a raw grape with skin.

In Comparative Example 1, the decrease rate was less than 30%, and a plurality of pieces (blobs) as a result of actual mastication did not have the disintegration characteristics. Therefore, Comparative Example 1 was disqualified in terms of the mouthfeel of a raw grape with skin. In Comparative Example 2, the decrease rate of the loss tangent value was over 90%, and Comparative Example 2 can be considered to have the highest level of disintegration characteristics if the decrease rate is used as the index for disintegration. However, in actuality, the gel composition started to disintegrate upon being put in the mouth, the solidified gel composition melted and disappeared after being masticated once or twice, and thereafter, only the collagen casing remained to be masticated. Thus, the gel composition of Comparative Example 2 had a mouthfeel far away from a raw grape with skin.

Test Example 2

With respect to the grape-like confectioneries of Examples 1 to 4 and the grape flavored confectioneries of Comparative Examples 1 and 2, the water migration rate (%) of the solidified gel composition was measured as follows. A fixed weight of the grape-like or grape flavored confectionery was placed in an airtight package and stored in an incubator (product name: DRX620TA, manufactured by Advantech Co., Ltd) at 37° C. for one or two weeks. Then, the grape-like or grape flavored confectionery was removed from the package and weighed, and the water migration rate (%) of the confectionery was calculated. The results are shown in Table 2. Week zero denotes the state immediately after production.

TABLE 2

|  | Week zero | After one week | After two weeks |
| --- | --- | --- | --- |
| Example 1 | 0 | 0.529 | 1.197 |
| Example 2 | 0 | 0.322 | 1.289 |
| Example 3 | 0 | 0.432 | 0.640 |
| Example 4 | 0 | 0.597 | 1.497 |
| Comparative Example 1 | 0 | 0.105 | 0.482 |
| Comparative Example 2 | 0 | 0.689 | 2.375 |

*All values are in %

The results in Table 2 show that the collagen casings of Examples 1 to 4 became fully swollen, and good fruit juice feelings were able to be obtained. Meanwhile, the collagen casing of Comparative Example 1 did not become fully swollen, and retained a crispy mouthfeel unique to a collagen casing and had a crunchy mouthfeel in the mouth that is far from the mouthfeel of fruit skin. The collagen casing of Comparative Example 2 became fully swollen but had a high level of syneresis liquid that permeated the collagen casing, and putrefaction was found in Week 2.

Example 5

A gel composition was prepared by a method similar to that in Example 1, filled in a collagen casing having a film thickness of 100 μm with use of a filling machine, and then naturally cooled by drying at normal temperature for six hours. The resultant composition was covered with a brightening agent to make a grape-like confectionery.

Example 6

A grape-like confectionery was made by a method similar to that in Example 5 except that the film thickness of the collagen casing was changed from 100 μm to 5 μm.

Comparative Example 3

A grape flavored confectionery was made by a method similar to that in Example 5 except that the film thickness of the collagen casing was changed from 100 μm to 110 μm.

Comparative Example 4

A grape flavored confectionery was made by a method similar to that in Example 5 except that the film thickness of the collagen casing was changed from 100 μm to 3 μm.

Reference Example 3

A collagen casing having a film thickness of 50 μm with no gel composition being filled therein was prepared.

Test Example 3

The following tests were conducted. The results are shown in Table 3.

[Breaking Weight and Breaking Strength of Collagen Casing]

The strengths (breaking strength) of the collagen casings peeled from the grape-like confectioneries of Examples 1, 5, and 6 and from the grape flavored confectioneries of Comparative Example 3 and 4, as well as the collagen casing of Reference Example 3 were measured. That is, a rheometer (product name: Texture Analyzer TA. XT plus, manufactured by Stable Micro Systems) and a cylindrical plunger having a diameter of 2 mm (article name: P2) were used to obtain a maximum load that was required for the cylindrical plunger to pierce a collagen casing (a breaking weight, in grams) when the plunger was pushed against the collagen casing to apply a load at 20° C. The breaking strength of the collagen casing is a breaking weight per unit area (g/cm$^2$) that is obtained by dividing the breaking strength by the area of the collagen casing.

[Fruit Skin Mouthfeel]

The fruit skin mouthfeels of the grape-like confectioneries of Examples 1, 5, and 6, and the grape flavored confectioneries obtained in Comparative Examples 3 and 4 were evaluated by the following standards.

○: Had a fruit skin-like mouthfeel
x: Did not have a fruit skin-like mouthfeel

TABLE 3

|  | Breaking weight (g) | Breaking strength (g/cm²) | Fruit skin mouthfeel |
|---|---|---|---|
| Example 1 | 111.4 | 3547.1 | ○ |
| Example 5 | 264.2 | 8414.4 | ○ |
| Example 6 | 89.7 | 2857.3 | ○ |
| Comparative Example 3 | 530.1 | 16881.3 | x |
| Comparative Example 4 | Burst and could not be filled | | |
| Reference Example 3 | 1031.3 | 32845.1 | x |

According to the result of Table 3, good fruit skin mouthfeels were obtained in Examples 1, 5, and 6 when collagen casings having a film thickness of 5 to 100 μm were used. When a collagen casing having a film thickness of over 100 μm was used, the confectionery had a tough mouthfeel, which was far from the mouthfeel of fruit skin, and the casing didn't melt completely but remained in the mouth (Comparative Example 3). The collagen casing having a film thickness of less than 5 μm had very low durability and burst upon being filled, and was not able to make a grape-like confectionery (Comparative Example 4). In addition, from Reference Example 3, it was found that the grape skin mouthfeel cannot be obtained with the collagen casing alone, and the presence of syneresis liquid from the gel composition is necessary to obtain a fruit skin-like mouthfeel.

The invention claimed is:

1. A confectionery having a grape-like mouthfeel, the confectionery comprising:
    a solidified gel composition; and
    a collagen casing coating the solidified gel composition, wherein;
    the solidified gel composition has a dynamic viscoelastic pattern similar to a dynamic viscoelastic pattern of a flesh of a raw grape, the dynamic viscoelastic pattern of the gel composition being set based on a loss tangent value at angular frequencies of 3.98 rad/S and 63.1 rad/S, to impart a mouthfeel of a raw grape with skin,
    the solidified gel composition contains metal ions,
    a content of the metal ions of the solidified gel composition is adjusted to be one of: a weight ratio between Na ions and K ions is set to be in a range of the K ions: the Na ions=1.5 to 4:1,
    a weight ratio between the Na ions and the K ions is set to be in a range of the K ions: the Na ions=1.5 to 4:1, under a condition that a content of the K ions is set to be 4 to 20 mmol/kg, and
    a weight ratio of the K ions to a total weight of Ca ions and Mg ions is set such that the K ions: (the Ca ions+the Mg ions)=2 to 7:1.

2. The confectionery having the grape-like mouthfeel according to claim 1, wherein
    the solidified gel composition has the dynamic viscoelastic pattern, similar to the dynamic viscoelastic pattern of the flesh of the raw grape, in which the loss tangent value at the angular frequency of 63.1 rad/S decreases by 34 to 83% relative to the loss tangent value at the angular frequency of 3.98 rad/S.

3. The confectionery having the grape-like mouthfeel according to claim 2, wherein
    the solidified gel composition has a pH of 2 to 4, a moisture value of 20 to 45 weight %, and a moisture activity value of 0.6 to 0.86, and has a water migration ability in which water contained in the solidified gel composition exudes to a surface of the solidified gel composition, and
    a water migration rate of the solidified gel composition left standing for one week at 37° C. is 0.3 to 0.6 weight % and a water migration rate of the solidified gel composition left standing for two weeks at 37° C. is 0.6 to 1.5 weight %.

4. The confectionery having the grape-like mouthfeel according to claim 2, wherein
    the collagen casing has a film thickness of 5 to 100 μm, and
    the collagen casing prepared in a manner that the solidified gel composition is coated by the collagen casing, dried at room temperature for six hours, and removed from the collagen casing with the collagen casing having a breaking strength of 2800 to 9000 g/cm².

5. The confectionery having the grape-like mouthfeel according to claim 1, wherein
    the solidified gel composition has a pH of 2 to 4, a moisture value of 20 to 45 weight %, and a moisture activity value of 0.6 to 0.86, and has a water migration ability in which water contained in the solidified gel composition exudes to a surface of the solidified gel composition, and
    a water migration rate of the solidified gel composition left standing for one week at 37° C. is 0.3 to 0.6 weight % and a water migration rate of the solidified gel composition left standing for two weeks at 37° C. is 0.6 to 1.5 weight %.

6. The confectionery having the grape-like mouthfeel according to claim 5, wherein
    the collagen casing has a film thickness of 5 to 10 μm, and
    the collagen casing prepared in a manner that the solidified gel composition is coated by the collagen casing dried at room temperature for six hours, and removed from the collagen casing with the collagen casing having a breaking strength of 2800 to 9000 g/cm².

7. The confectionery having the grape-like mouthfeel according to claim 1, wherein
    the collagen casing has a film thickness of 5 to 100 μm, and
    the collagen casing prepared in a manner that the solidified gel composition is coated by the collagen casing, dried at room temperature for six hours, and removed from the collagen casing with the collagen casing having a breaking strength of 2800 to 9000 g/cm².

8. The confectionery having the grape-like mouthfeel according to claim 7, wherein
    the collagen casing has a film thickness of 5 to 100 μm, and
    the collagen casing prepared in a manner that the solidified gel composition is coated by the collagen casing, dried at room temperature for six hours, and removed from the collagen casing with the collagen casing having a breaking strength of 2800 to 9000 g/cm².

9. The confectionery having a grape-like mouthfeel according to claim 1, wherein:
    the solidified gel composition contains gum, a gelatin, and glycerin,
    content of the gum in the solidified gel composition is in a range of 1.5 to 5 wt. %,
    content of the gelatin in the solidified gel composition is in a range of 0.1 to 2.5 wt. %,
    content of the glycerin in the solidified gel composition is in a range of 3 to 15 wt. %, and the solidified gel composition has a dynamic viscoelastic pattern similar to a dynamic viscoelastic pattern of a flesh of a raw grape, in which a loss tangent value at an angular frequency of 63.1 rad/S decrease by 34 to 83% relative to a loss tangent value at an angular frequency of 3.98 rad/S, and the collagen casing has a film thickness of 5 to 100 μm.

10. The confectionery having a grape-like mouthfeel according to claim 1, wherein the solidified gel composition contains:

0.5 to 15 wt. % of at least one type selected from the group consisting of a gelling agent and a polysaccharide thickener, or at least one type selected from the group consisting of a combination of the gelling agent, the gelatin, and the gum; a combination of the gelling agent and the gum; an combination of the gelatin and the gum; and the gum alone, content of the saccharide is in a range of 30 to 75 wt. %, content of glycerin is in a range of 3 to 15 wt. %, and content of water is in a range of 20 to 45 wt. %.

11. The confectionery having a grape-like mouthfeel according to claim 1, wherein a component of the metal ions is at least one type selected from the group consisting of a metal salt of organic acid as an acidulant, an additive containing a metal salt or the metal ions, an inorganic salt, and an organic salt.

* * * * *